(12) United States Patent
Sprague

(10) Patent No.: US 10,802,195 B1
(45) Date of Patent: Oct. 13, 2020

(54) HIGH CONTRAST FRONTLIGHT STRUCTURES FOR REFLECTIVE DISPLAYS

(71) Applicant: Amazon Technologies, Inc., Seattle, WA (US)

(72) Inventor: Robert Arthur Sprague, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 58 days.

(21) Appl. No.: 16/144,623

(22) Filed: Sep. 27, 2018

(51) Int. Cl.
*G02F 1/1335* (2006.01)
*F21V 8/00* (2006.01)
*G02F 1/13357* (2006.01)

(52) U.S. Cl.
CPC .......... *G02B 6/0035* (2013.01); *G02F 1/1336* (2013.01); *G02F 2001/133616* (2013.01)

(58) Field of Classification Search
None
See application file for complete search history.

(56) References Cited

U.S. PATENT DOCUMENTS

| 6,847,424 B2* | 1/2005 | Gotoh | G02F 1/133615 349/113 |
| 2009/0010023 A1* | 1/2009 | Kanade | G02B 6/0035 362/606 |

* cited by examiner

*Primary Examiner* — Richard H Kim
(74) *Attorney, Agent, or Firm* — Eversheds Sutherland (US) LLP

(57) ABSTRACT

Systems, methods, and computer-readable media are disclosed for high contrast frontlight structures for reflective displays and related devices. In one embodiment, an example display structure may include a diode, a reflective display, and a light guide coupled to the reflective display and configured to direct light from the diode, the light guide. The light guide may include a first layer having a first refractive index value, a second layer having a second refractive index value, a third layer having the first refractive index value, and a fourth layer having the second refractive index value, where the second refractive index value is greater than the first refractive index value.

18 Claims, 7 Drawing Sheets

HIGH CONTRAST FRONTLIGHT STRUCTURES FOR REFLECTIVE DISPLAYS

BACKGROUND

Electronic devices may include displays to present content to users. Content may include text, images, videos, and so forth. In some instances, visibility of text may be affected by a contrast ratio between characters of text and a background color. For example, a contrast ratio between black text and a white background may affect the readability and/or viewability of the text or other content on the display. In some instances, relatively higher contrast ratios may be relatively easier to view and/or consume by users. Accordingly, displays that can output higher contrast ratios may be desired.

Figure 1:
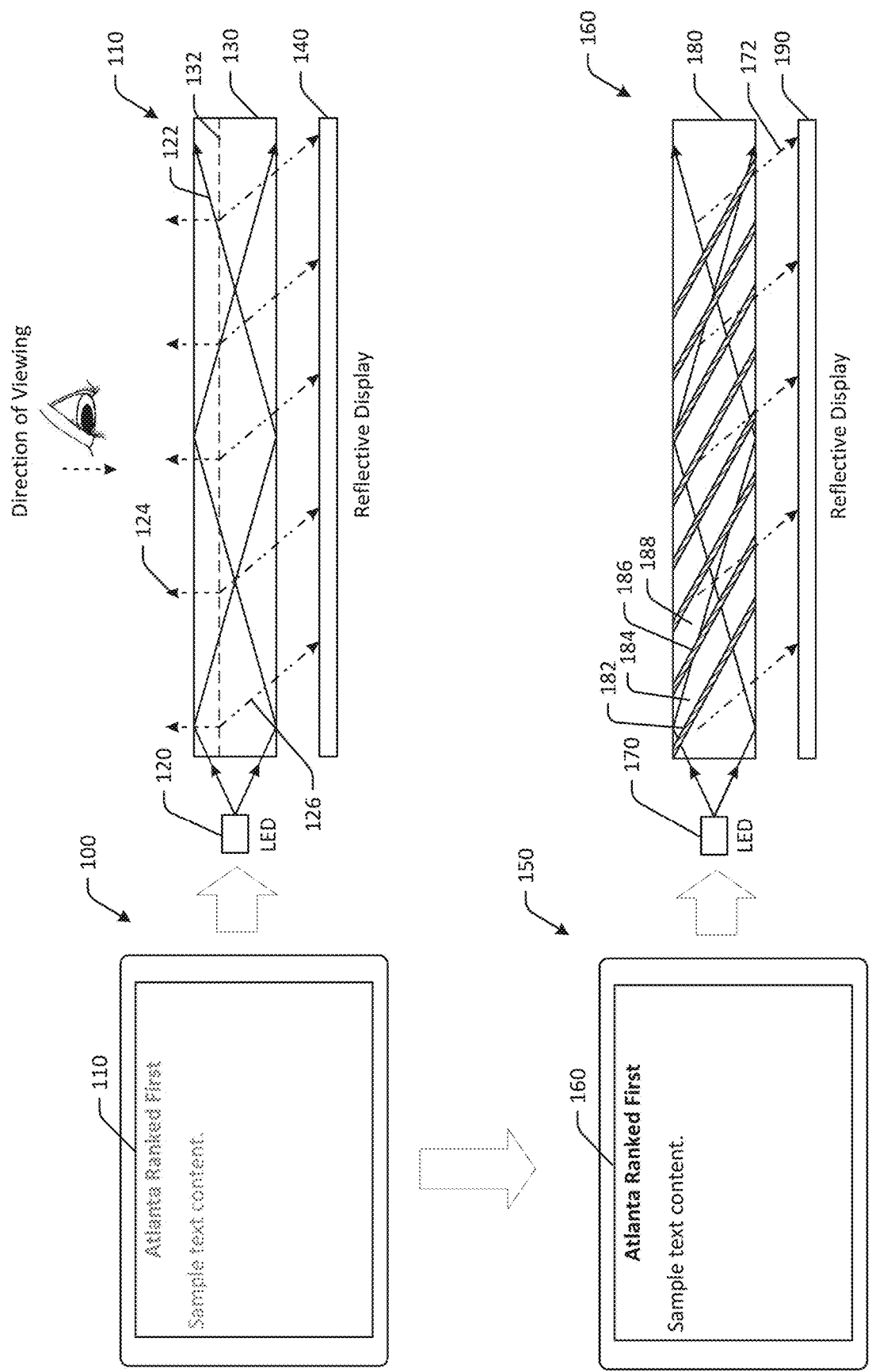
FIG. 1 is a schematic illustration of an example use case of a high contrast frontlight structure for a reflective display in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be used to consume content, such as text-based content, image-based content, video-based content, and so forth. For example, electronic devices may be configured to render locally stored content, stream content, and the like. Electronic devices may include a variety of devices, such as electronic reader (e-reader) devices, computers, smartphones, tablet computers, televisions, wearable devices, display devices, and so forth that may be used to present digital content. Electronic devices may therefore include displays that may be used to present content to users.

Content that is presented at a display of a device may be consumed by one or more users. However, in some instances, ease of consumption of the content may be improved when contrast ratios of the content that is presented are increased. For example, readability of text may be improved when the contrast ratio between the text and a background is increased. A relatively higher contrast ratio may result in a relatively greater amount of detail that is visible to a user. For example, a contrast ratio of 7:1 may be sufficient for some users to passively view content with a limited amount of detail, while a contrast ratio of 15:1 may be sufficient for users to view an increased amount of detail relative to the detail visible at the contrast ratio of 7:1. Accordingly, increased contrast ratios may improve readability and consumption of digital content by presenting content with more detail and improved clarity.

Some electronic devices may use reflective displays to present content. Reflective displays may present content by reflecting ambient light, as opposed to emitting light. As a result, reflective displays may be used, in one example, to improve consumption of content in sunlight, as glare may be reduced relative to other types of displays, thereby improving visibility. Reflective displays may have frontlight structures that include one or more lighting elements, such as diodes (e.g., laser diodes, light emitting diodes (LEDs), etc.) or any other suitable lighting element, that emits light towards an edge surface, or side surface, of a light guide. The light may propagate through the light guide, and at least a portion of the light may be directed towards a reflective display, such as a liquid crystal display (LCD) panel. The light may be reflected by the reflective display to present content.

However, in some instances, a portion of the light emitted by the LEDs and/or propagating through the light guide may be scattered away from the reflective display, and may exit an upper surface ("upper" and "lower" as used herein are for illustrative purposes only, and do not indicate absolute positions), or a surface through which a user consumes content. The scattered light may therefore negatively impact contrast ratios and/or content quality. To reduce the amount of scattered light that exits an upper surface, some frontlight structures include light guides with internal scattering layers, which may be patterns or internal features, such as raised protrusions, directional grooves, and/or other patterns to redirect scattered light and reduce an amount of scattered light that exits the upper surface. However, such patterns or features may not sufficiently reduce the amount of scattered light that exits the upper surface.

Referring to FIG. 1, an example use case of a high contrast frontlight structure for a reflective display is illustrated in accordance with one or more embodiments of the disclosure. In FIG. 1, a device 100 with a display 110 is illustrated. The display 110 may be a display that includes a frontlight structure with a light guide that has an internal scattering layer. Specifically, the display 110 may include an LED 120, a light guide 130, and a reflective display 140. The light guide 130 may include an internal scattering layer 132. Light 122 emitted from the LED 120 may propagate through the light guide 130. A first portion 124 of the light 122 may impinge the internal scattering layer 132 and may be scattered outwards through an upper surface of the light guide 130 and/or the display 110, thereby negatively impacting a contrast ratio of the content presented at the display 110. A second portion 126 of the light 122 may propagate through the light guide 130, impinge the internal scattering layer 132, and may be directed towards the reflective display 140. The second portion of light 126 may be reflected from the reflective display 140. Accordingly, the display 110 may scatter some light in the direction of a user or observer, thus limiting the contrast of the image or other content that is presented. The cross-sectional views illustrated in FIG. 1 are of a light guide that may be viewed by a user as illustrated, or through an upper surface of the light guide 180.

FIG. 1 also illustrates a device 150 with a display 160 that includes a high contrast frontlight structure for a reflective display in accordance with one or more embodiments of the disclosure. The display 160 may include one or more LEDs 170, a light guide 180, and a reflective display 190. The one or more LEDs may be disposed about an edge surface of the light guide 180. The light guide 180 may include or be formed from one or more materials configured to direct light along a planar surface. In some implementations, the light guide 180 may be used to frontlight the reflective display 190 by directing at least a portion of light from the one or more LEDs 170 onto a portion of the reflective display 190. An optional optically clear adhesive layer may be positioned at least partially between the light guide 180 and the reflective display 190. The optically clear adhesive layer may be formed of an optically clear adhesive, and may be in liquid or solid form. In some embodiments, the optically clear adhesive may be an adhesive tape or an acrylic adhesive.

The light emitted by the one or more LEDs 170 may propagate through the light guide 180, and at least a portion of the light may be directed towards the reflective display 190. However, an amount of light that is scattered in a direction of the user may be reduced as a result of the light guide 180.

The light guide 180 may include alternating layers of relatively lower and relatively higher refractive index values. The alternating layers may be tilted or arranged at one or more angles relative to a horizontal axis of the light guide 180. The alternating layers may have uniform or non-uniform spacing. The alternating layers may be embedded or encased in the light guide (e.g., "buried" in the light guide, etc.), or may extend from an upper surface to a lower surface of the light guide. The alternating layers may have the same or different thicknesses. Some embodiments may include layers of more than two refractive index values.

For example, in FIG. 1, the light guide 180 may include a first layer or first angled layer 182, a second layer or second angled layer 184, a third layer or third angled layer 186, a fourth layer or fourth angled layer 188, and so forth. The second angled layer 184 may be disposed adjacent to the first angled layer 182, and the third angled layer 186 may be disposed adjacent to the second angled layer 184. The fourth angled layer 188 may be disposed adjacent to the third angled layer 186. The first angled layer 182 may be relatively closest to the LED 170, and the fourth LED 188 may be relatively farthest from the LED 170. Any number of layers may be included. In some embodiments, the light guide 180 may include a plurality of layers, such as angled layers. The layers may not be illustrated to scale, and may not be illustrated to scale with respect to other layers or other figures.

Some or all of the layers may be angled or tilted with respect to a horizontal axis of the light guide 180. For example, one or more, or each, of the first angled layer 182, the second angled layer 184, the third angled layer 186, and/or the fourth angled layer 188 may be disposed transverse to a horizontal axis of the light guide 180. In some embodiments, the respective layers may be oriented at an angle of about 45 degrees relative to the horizontal axis. In other embodiments, the respective layers may be oriented at an angle or offset of about 10 degrees. In some instances, different layers may have different orientation angles relative to the horizontal axis or a different axis of the light guide 180.

The respective angled layers may have different refractive index values. In some instances, the respective angled layers may alternate between layers having a first refractive index value, and layers having a second refractive index value. A refractive index value of an optical medium, such as the layers of the light guide 180, is a dimensionless number that indicates how light, or any other radiation, propagates through that specific medium. A refractive index value of a specific medium is defined as $$n = \frac{c}{v}$$

where c is the speed or light in vacuum and v is the speed of light in the substance. For example, the refractive index value of water is 1.33, meaning that light travels 1.33 times faster in a vacuum than it does in water. Other methods of calculating or measuring refractive index values may be used herein.

The first angled layer 182 and the third angled layer 186 may have a first refractive index value, such as a refractive index value of about 1.57. The second angled layer 184 and the fourth angled layer 188 may have a second refractive index value, such as a refractive index value of about 1.59. The refractive index value of a layer may be impacted by the material with which the layer is formed. In one example, the refractive index value of a light guide layer formed of polycarbonate material may be 1.59 (e.g., n=1.59), whereas a or poly(methyl methacrylate) (PMMA) material may have a refractive index value of about 1.49. Other embodiments may have different refractive index values and/or different differences between the respective refractive index values of the layers.

Light emitted by the LED 170 may propagate through the light guide 180 and may reflect off of one or more of the respective angled layers. Reflected light 172 may be directed to the reflective display 190. Because of the layers and/or refractive index values, an amount of light that may have otherwise scattered towards a user may be reflected towards the reflective display 190, thereby avoiding negatively impacting the contrast ratio, and, in some instances, improving contrast ratios of content presented at the display 160.

Light reflected off the interface between relatively high and relatively low refractive index layers may be proportional to the square of the refractive index value difference between the layers. The angle of the layers may be configured to direct the reflected light toward the reflective display 190. Some embodiments may not include internal scattering layers or external scattering features.

As illustrated in FIG. 1, the text of the display 110 of the device 100 may have a contrast ratio that is less than the text of the display 160 of the device 150 because of the frontlight structure that includes the light guide 180 with the layers of varying refractive index values.

Embodiments of the disclosure include high contrast frontlight structures for reflective displays. Certain embodiments may include light guides that have layers of different refractive index values. Layers may be angled with respect to a horizontal or vertical axis of the light guide. Some embodiments may include layers that are spaced uniformly or non-uniformly. Certain embodiments may include layers that are formed of the same or different materials. Two or more sets of layers having different refractive index values may be included in some instances. In some embodiments, the refractive index difference between layers, and/or thickness spacing between the layers may be modified as a function of distance from the LED 170, so as to compensate for light fall off with distance in the light guide 180. While described in the context of reflective displays and frontlight structures, aspects of this disclosure are more broadly applicable to other forms of displays.

Example embodiments of the disclosure provide a number of technical features or technical effects. For example, in accordance with example embodiments of the disclosure, certain embodiments of the disclosure may mitigate light scattering issues, reduce display stack complexity, and improve visibility and/or readability of content. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
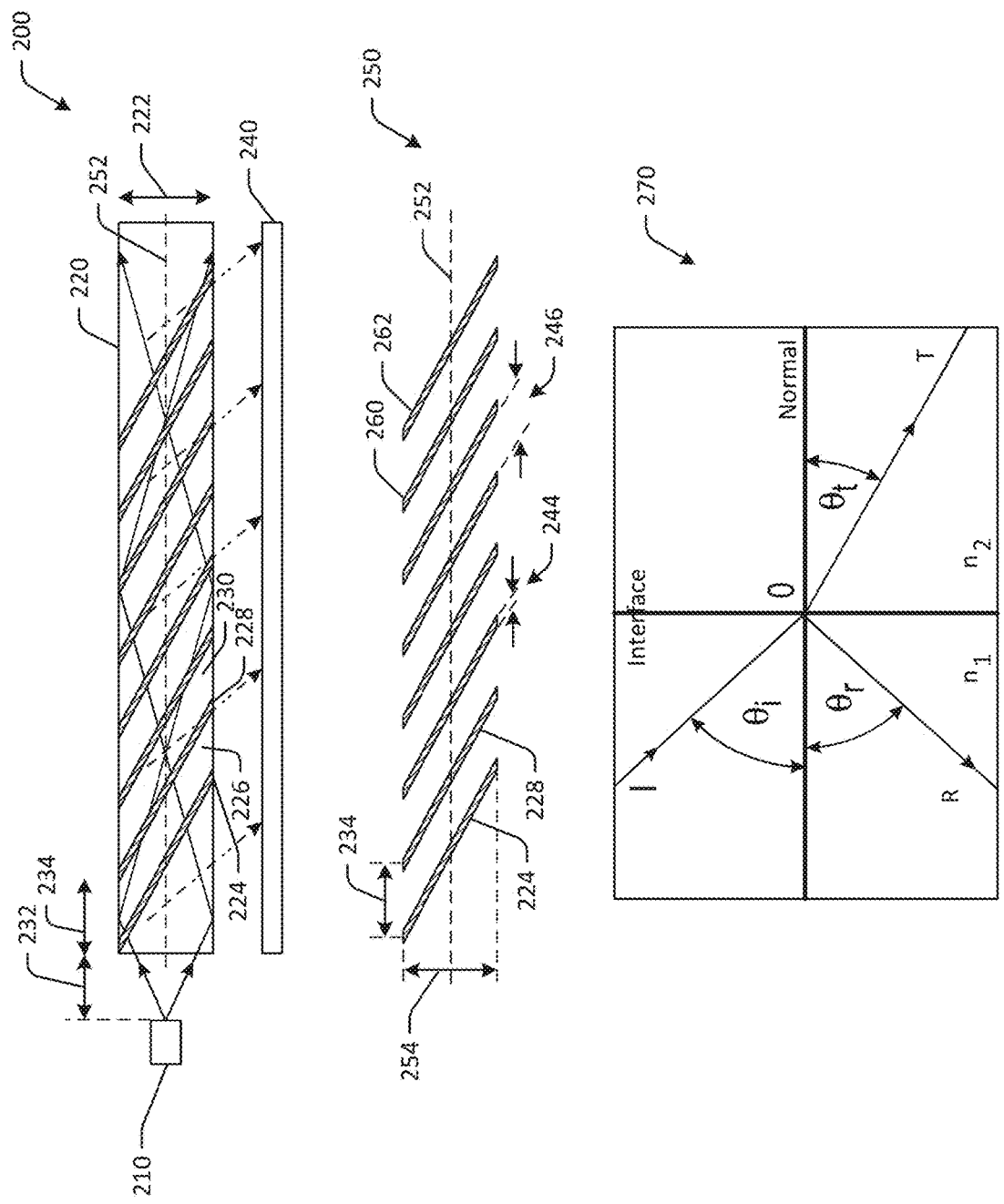
FIG. 2 is a schematic illustration of a cross-sectional view of a high contrast frontlight structure with layers in accordance with one or more embodiments of the disclosure.

FIG. 2 is a schematic illustration of a cross-sectional view of a high contrast frontlight structure 200 with alternating layers in accordance with one or more embodiments of the disclosure. Other embodiments may include additional or fewer components. FIG. 2 illustrates an example embodiment of a frontlight structure that includes a light guide having alternating layers of relatively higher and relatively lower refractive index values.

For example, the high contrast frontlight structure 200 may include one or more LEDs 210, a light guide 220, and a reflective display 240. The LED 210 may be disposed adjacent to a side surface of the light guide 220. The light guide 220 may be optically coupled to the reflective display 240. In some embodiments, the light guide 220 may be coupled to the reflective display 240 using an optically clear adhesive. The light guide 220 may be configured to direct light from the LED 210. The light guide 220 may have a first height or a first thickness 222. The light guide 220 may have a horizontal axis 252.

The light guide 220 may include a plurality of layers. For example, the light guide 220 may include a first layer 224 having a first refractive index value, a second layer 226 having a second refractive index value, a third layer 228 having the first refractive index value, a fourth layer 230 having the second refractive index value, and so forth. The second layer 226 may be disposed between the first layer 224 and the third layer 228, and the third layer 228 may be disposed between the second layer 226 and the fourth layer 230. Any number of layers may be included. In the example of FIG. 2, the second refractive index value may be greater than the first refractive index value. The second layer 226 and the fourth layer 230 may therefore be the relatively higher refractive index value layers. For example, the second refractive index value may be about 1.6, and the first refractive index value may be about 1.55. In other embodiments, the second refractive index value may be less than the first refractive index value.

In some embodiments, the light guide 220 may include additional layers with different refractive index values. For example, the light guide 220 may include a fifth layer 260 having a third refractive index value that is greater than the first refractive index value. The third refractive index value may be less than the second refractive index value in some embodiments, while in other embodiments, the third refractive index value may be greater than the second refractive index value. The fifth layer 260 may be disposed relatively further from the LED 210 than the first layer 224, the second layer 226, the third layer 228, and the fourth layer 230.

One or more, or each, of the first layer 224, the second layer 226, the third layer 228, and the fourth layer 230 may be disposed transverse to the horizontal axis 252 of the light guide 220. For example, one or more of the first layer 224, the second layer 226, the third layer 228, and the fourth layer 230 may be disposed transverse to the horizontal axis 252 of the light guide 220 at an angle of equal to or greater than about 10 degrees and equal to or less than about 45 degrees.

The first layer 224 and the third layer 228 may therefore be part of a first set of tilted layers having a first refractive index value, and the second layer 226 and the fourth layer 230 may be part of a second set of tilted layers having a second refractive index value that is greater than the first refractive index value. As illustrated in FIG. 2, the first set of tilted layers and the second set of tilted layers may be disposed in an alternating arrangement.

The first layer 224 may be separated from the LED 210 by a first distance 232. The third layer 228 may be separated from the LED 210 by the first distance 232 in addition to a second distance 234. The second distance 234 may be representative of a lateral thickness of the second layer 226. In some embodiments, thicknesses of respective relatively higher and relatively lower refractive index value layers may be consistent or variable.

The first layer 224 may be separated from the third layer 228 by the second distance 234, and the fifth layer 260 may be separated from a sixth layer 262 by the second distance 234. Specifically, a lateral distance 232 between the first layer 224 and the LED 210 may be less than a second lateral distance between the second layer 228 and the LED 210.

Accordingly, in some embodiments, spacing between layers having the relatively lower refractive index value may be consistent. In other embodiments, spacing between layers having the relatively lower refractive index value may not be consistent. The specific refractive index values for the respective layers may be determined based at least in part on a thickness of the respective layers, which may be indicative of the spacing between layers.

The relatively lower refractive index value layers are illustrated in isolated view 250. The relatively lower refractive index value layers may include the first layer 224 and the third layer 228, as well as additional layers, or in some instances, fewer layers. The relatively lower refractive index value layers may have the same lateral thickness in some embodiments. For example, the relatively lower refractive index value layers may have a first lateral thickness 244. The relatively lower refractive index value layers may be separated by a second lateral thickness 246 of the relatively higher refractive index value layers. The second lateral thickness 246 may be greater than the first lateral thickness 244. In some embodiments, the second lateral thickness 246 may be equal to, or substantially equal to, the second distance 234. The relatively lower refractive index value layers may have a second height 254 as measured along a vertical axis. The second height 254 may be equal to or less than the first height 222 of the light guide 220. In some embodiments, the second height 254 may be less than the first height 222, and the relatively lower refractive index value layers may be embedded in the light guide 220.

The first set of tilted layers, or the relatively lower refractive index value layers, may have the lateral thickness 244, which may be equal to or less than the lateral thickness 246 of the second set of tilted layers, or the relatively higher refractive index value layers. In some embodiments, individual layers in either the first set of tilted layers or the second set of tilted layers may have different thicknesses.

The Fresnel equations may be used to define the amount of reflection off a surface at the interface between a layer of relatively lower refractive index value and a layer of relatively higher refractive index value. In a diagram 270 illustrated in FIG. 2, an incident plane wave in the direction of the ray IO impinges the interface between a first layer having a refractive index value of $n_1$ and a second layer having a refractive index value of $n_2$ at point O. Part of the wave is reflected in the direction OR, and part of the wave is refracted in the direction OT. The angle between the incident wave and normal of the interface is $\theta_i$. The angle between the reflected wave and normal of the interface is Or. The angle between the refracted wave and normal of the interface is $\theta_r$. $\theta_i$ is the entering angle of incidence on the interface, and $\theta_r$ is the exiting angle of incidence from the interface. The simplified equation for normal incidence is:

$$R = \frac{|n_1 - n_2|^2}{|n_1 + n_2|}.$$

The Fresnel equations may be used, in one example, to determine refractive index values of one or more layers by determining reflectance from each layer interface.

Figure 3:
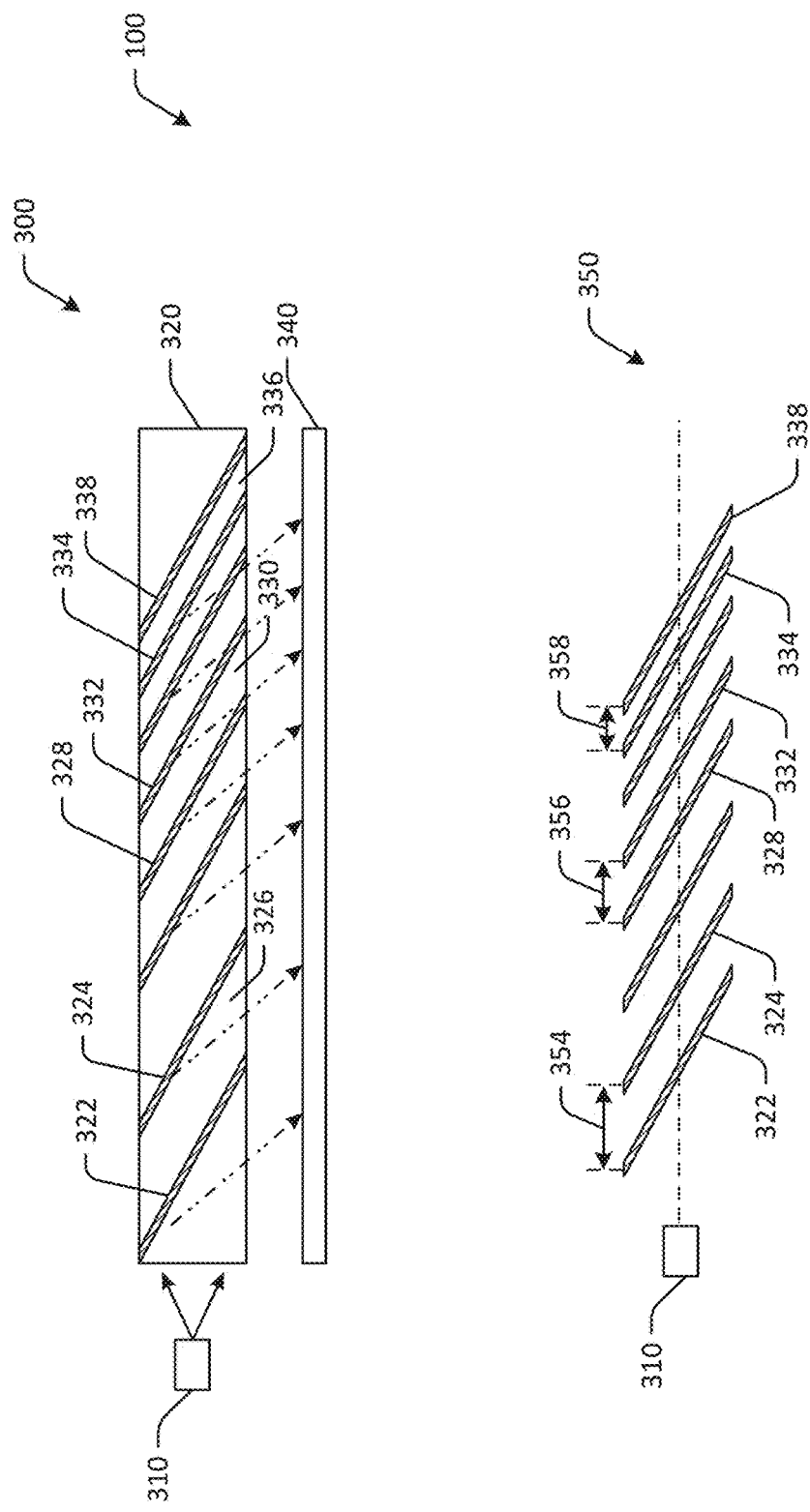
FIG. 3 is a schematic illustration of a cross-sectional view of a high contrast frontlight structure with layers having variable spacing in accordance with one or more embodiments of the disclosure.

FIG. 3 is a schematic illustration of a cross-sectional view of a high contrast frontlight structure 300 with layers having variable spacing in accordance with one or more embodiments of the disclosure. Other embodiments may include additional or fewer components. FIG. 3 illustrates an example embodiment of a frontlight structure that includes a light guide having layers with variable density dependent on a distance of the respective pairs of layers from an LED. For example, density may be relatively less near an LED, where incident light is brighter, and relatively greater further away from an LED, where incident light is weaker. The high contrast frontlight structure 300 may therefore have increased uniformity of light intensity.

For example, the high contrast frontlight structure 300 may include one or more LEDs 310, a light guide 320, and a reflective display 340. The LED 310 may be disposed adjacent to a side surface of the light guide 320. The light guide 320 may be optically coupled to the reflective display 340. In some embodiments, the light guide 320 may be coupled to the reflective display 340 using an optically clear adhesive. The light guide 320 may be configured to direct light from the LED 310.

The light guide 320 may include a plurality of layers. For example, the light guide 220 may include a first layer 322 having a first refractive index value, a second layer 324 having the first refractive index value, a third layer 328 having the first refractive index value or a second refractive index value, a fourth layer 332 having the first refractive index value or the second refractive index value, a fifth layer 334 having the first refractive index value or a third refractive index value, a sixth layer 338 having the first refractive index value or the third refractive index value, and so forth. The second layer 324 may be disposed between the first layer 322 and the third layer 328, and the third layer 328 may be disposed between the second layer 324 and the fourth layer 332. Any number of layers may be included. In the example of FIG. 3, the optional second refractive index value may be greater than the first refractive index value, and the optional third refractive index value may be greater than the second refractive index value.

The respective first, second, third, fourth, fifth, and sixth layers may be part of a set of relatively lower refractive index value layers. A set of relatively higher refractive index value layers may separate the set of relatively lower refractive index value layers. For example, a first relatively higher refractive index value layer 326 may be disposed between the first layer 322 and the second layer 324. A second relatively higher refractive index value layer 330 may be disposed between the third layer 328 and the fourth layer 332. A third relatively higher refractive index value layer 336 may be disposed between the fifth layer 334 and the sixth layer 338.

A density of the relatively lower refractive index value layers may shift relative to proximity to the LED 310. For example, the first layer 322 and the second layer 324 may be relatively closer to the LED 310 than the third layer 328 and the fourth layer 332. Accordingly, a first distance 354 between the first layer 322 and the second layer 324 may be greater than a second distance 356 between the third layer 328 and the fourth layer 332. Likewise, the third layer 328 and the fourth layer 332 may be relatively closer to the LED 310 than the fifth layer 334 and the sixth layer 338. Accordingly, the second distance 356 may be greater than a third distance 358 between the fifth layer 334 and the sixth layer 338. The example shift in density, as represented via spacing of the layers, is illustrated in isolated view 350.

The spacing or lateral distance between respective relatively lower refractive index value layers may be determined or adjusted, in some instances, by adjusting a thickness of the relatively higher refractive index value layers, such as layers 326, 330, and 336.

Figure 4:
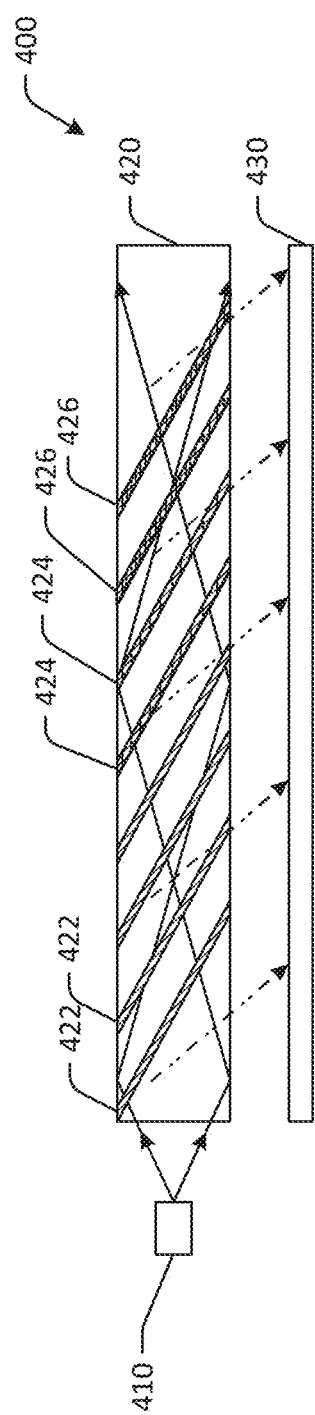
FIG. 4 is a schematic illustration of a cross-sectional view of a high contrast frontlight structure with layers of variable refractive index values in accordance with one or more embodiments of the disclosure.

FIG. 4 is a schematic illustration of a cross-sectional view of a high contrast frontlight structure 400 with layers of variable refractive index values in accordance with one or more embodiments of the disclosure. Other embodiments may include additional or fewer components. FIG. 4 illustrates an example embodiment of a frontlight structure that includes a light guide having layers with variable refractive index values dependent on a distance of the respective layers from an LED. For example, refractive index values may be relatively less near an LED, and relatively greater further away from an LED. For example, refractive index values may gradually increase (e.g., so as to avoid potential demarcation, etc.) as distance from a light source increases. As a result, a refractive index difference between layers may be relatively less where incident light is brighter near an LED, and relatively greater where incident light is weaker, further away from the LED.

For example, the high contrast frontlight structure 400 may include one or more LEDs 410, a light guide 420, and a reflective display 430. The LED 410 may be disposed adjacent to a side surface of the light guide 420. The light guide 420 may be optically coupled to the reflective display 430. In some embodiments, the light guide 420 may be coupled to the reflective display 430 using an optically clear adhesive. The light guide 420 may be configured to direct light from the LED 410.

The light guide 420 may include a plurality of layers. For example, the light guide 420 may include a first set of one or more layers having a first refractive index value 422, a second set of one or more layers having a second refractive index value 424, and a third set of one or more layers having a third refractive index value 426. The first refractive index value 422 may be less than the second refractive index value 424, and the second refractive index value 424 may be less than the third refractive index value 426. The particular refractive index values may be determined based at least in part on a distance between the respective layer and the LED 410. In some embodiments, only two refractive index values may be used, while in other embodiments, more than two refractive index values may be used. Any number of layers may be included.

For example, in FIG. 4, a first layer having the first refractive index value 422 may be disposed a first distance from the LED 410, a second layer having the first refractive index value 422 may be disposed a second distance from the LED 410 that is greater than the first distance, a third layer having the second refractive index value 424 may be disposed a third distance from the LED 410 that is greater than the second distance, a fourth layer having the second refractive index value 424 may be disposed a fourth distance from the LED 410 that is greater than the third distance, a fifth layer having the third refractive index value 426 may be disposed a fifth distance from the LED 410 that is greater than the fourth distance, and a sixth layer having the third refractive index value 426 may be disposed a sixth distance from the LED 410 that is greater than the fifth distance. In some embodiments, additional or fewer layers may be included. For example, a sixth layer having a fourth refractive index value that is greater than the third refractive index value may be disposed a seventh distance from the LED 410 that is greater than the sixth distance, and so forth.

Figure 5:
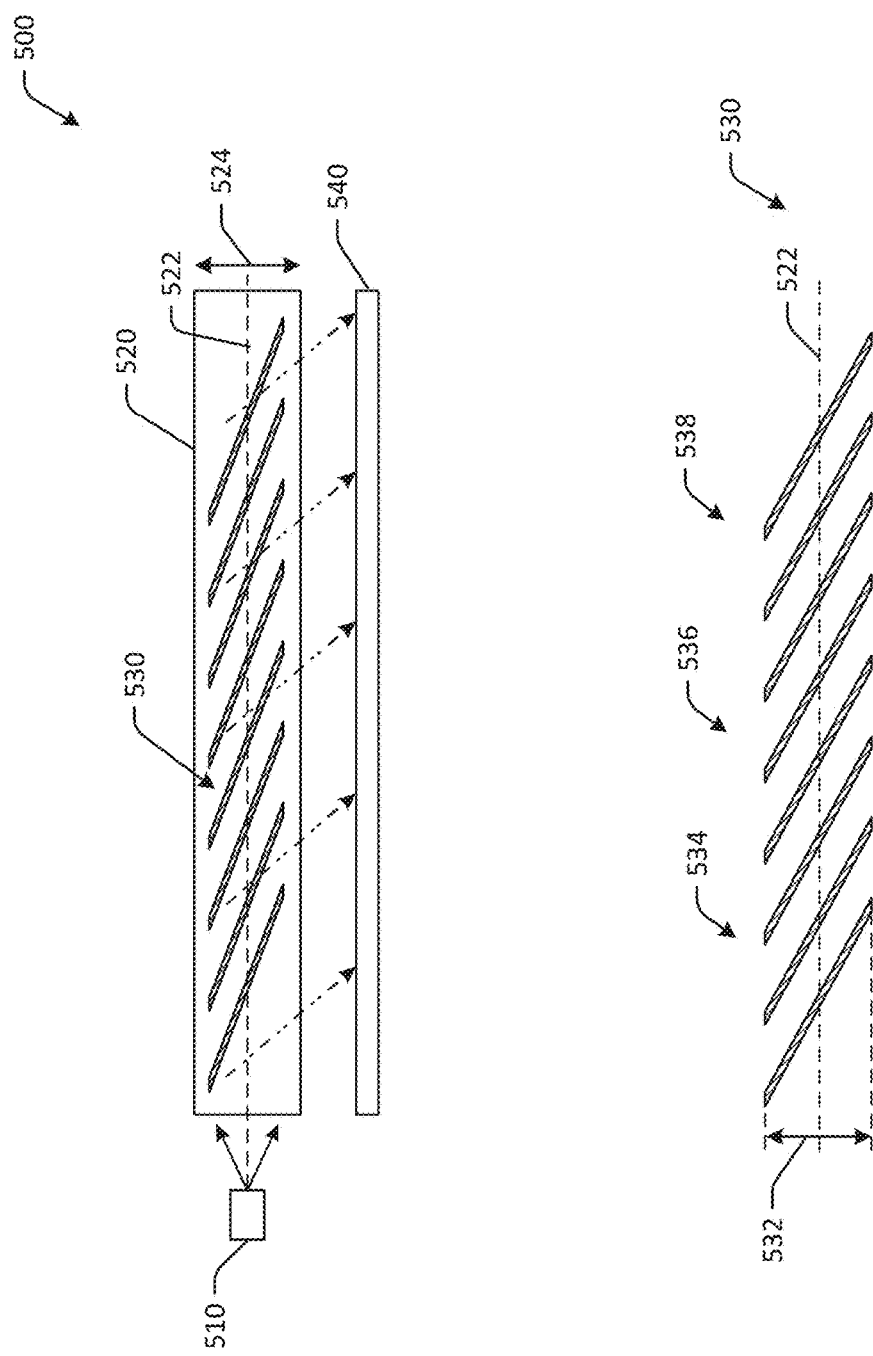
FIG. 5 is a schematic illustration of a cross-sectional view of a high contrast frontlight structure with embedded layers of variable refractive index values in accordance with one or more embodiments of the disclosure.

FIG. 5 is a schematic illustration of a cross-sectional view of a high contrast frontlight structure 500 with embedded layers of variable refractive index values in accordance with one or more embodiments of the disclosure. Other embodiments may include additional or fewer components. FIG. 5 illustrates an example embodiment of a frontlight structure that includes a light guide having layers that are embedded within the light guide. As a result, light scattering at an upper surface of the light guide may be minimized. The embedded layers may have the same refractive index values or may have variable refractive index values, as described with respect to FIG. 4.

For example, the high contrast frontlight structure 500 may include one or more LEDs 510, a light guide 520, and a reflective display 540. The LED 510 may be disposed adjacent to a side surface of the light guide 520. The light guide 520 may be optically coupled to the reflective display 540. In some embodiments, the light guide 520 may be coupled to the reflective display 540 using an optically clear adhesive. The light guide 520 may be configured to direct light from the LED 510.

The light guide 520 may include a plurality of layers 530 embedded in the light guide. The plurality of layers 530 may have the same configuration, such as refractive index value, angle of tilt, dimensions, and so forth. In some embodiments, the plurality of layers 520 may have different configurations, such as different density based on distance from an LED, different refractive index values based on distance from an LED, and so forth. In some embodiments, the plurality of layers 530 may be vertically aligned along a horizontal axis 522 of the light guide 520. The plurality of layers 530 may have a first height 532 as measured along a vertical axis of the light guide 520 that is less than a second height 524 of the light guide.

In some embodiments, the plurality of layers 530 may have the same refractive index values, while in other embodiments, the plurality of layers 530 may have different refractive index values. For example, the light guide 520 may include a first set of one or more layers 534 having a first refractive index value, a second set of one or more layers having a second refractive index value 536, and a third set of one or more layers having a third refractive index value 538. The first refractive index value may be less than the second refractive index value, and the second refractive index value may be less than the third refractive index value. The particular refractive index values may be determined based at least in part on a distance between the respective layers and the LED 510. In some embodiments, only two refractive index values may be used, while in other embodiments, more than two refractive index values may be used. Any number of layers may be included.

Figure 6:
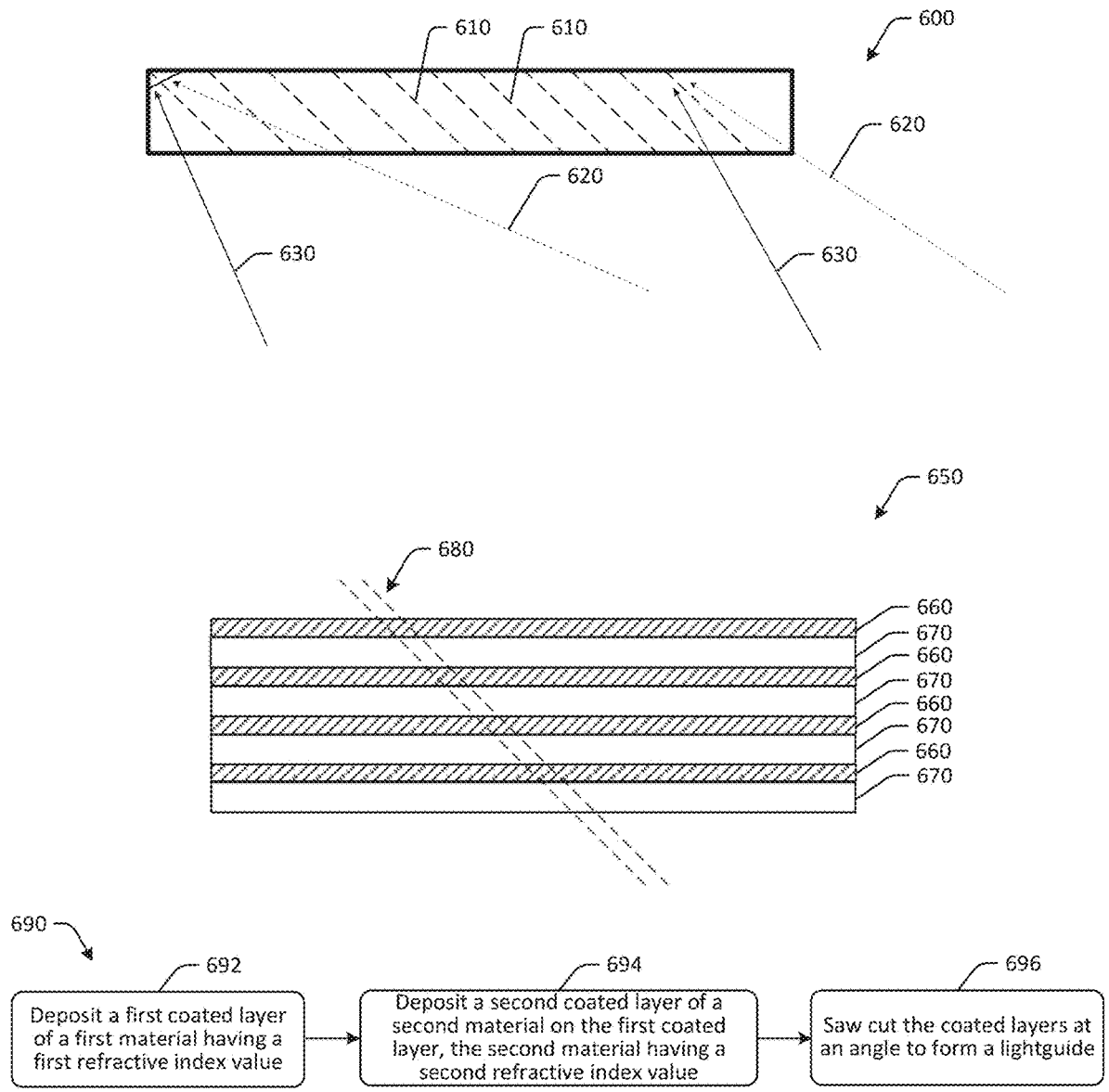
FIG. 6 is a schematic illustration of various methods of manufacturing high contrast frontlight structures in accordance with one or more embodiments of the disclosure.

FIG. 6 is a schematic illustration of various methods of manufacturing high contrast frontlight structures in accordance with one or more embodiments of the disclosure. A first example method 600 includes a holographic exposure apparatus to make a tilted structure. A first collimated beam 630 and a second collimated beam 620 may be used to generate intensity peaks of interference patterns 610 in light guide material. An interference pattern (e.g., hologram) may therefore be generated at the correct angle to expose a light sensitive layer which may change refractive index on exposure. Materials for holographic exposure may include photopolymers, photoresist, and the like.

A second example method 690 includes, at block 692, depositing a first coated layer of a first material having a first refractive index value. At block 694, a second coated layer of a second material having a second refractive index value is deposited on the first coated layer. At block 696, the coated layers are saw cut at an angle to form a light guide. Any number of layers may be deposited.

For example, coated layers 650 may include a number of first coated layers 660 of a first refractive index value and a number of second coated layers 670 of a second refractive index value, and a saw cut at an angle may form a light guide 680. Materials for deposited or formed layers may include polycarbonate, PMMA, and the like.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
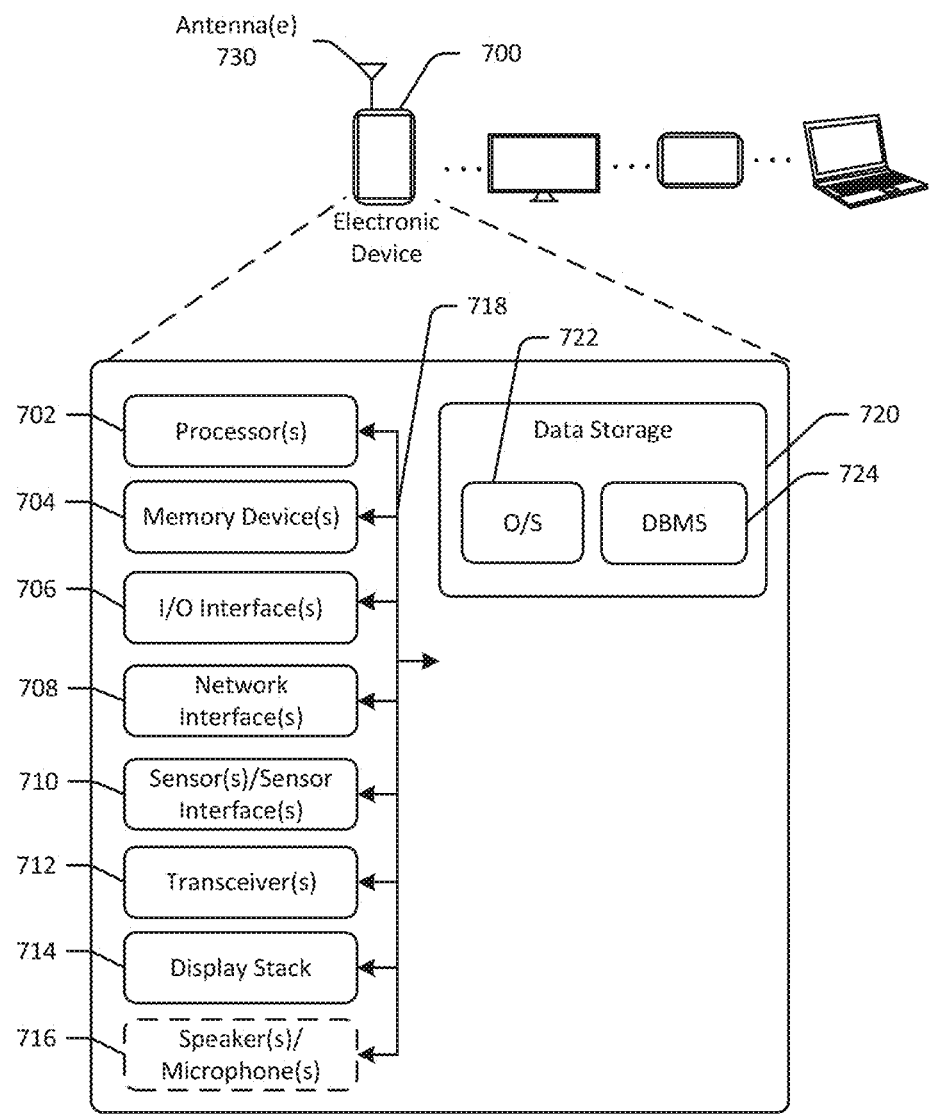
FIG. 7 schematically illustrates an example architecture of an electronic device in accordance with one or more embodiments of the disclosure.

FIG. 7 is a schematic block diagram of one or more illustrative electronic device(s) 700 in accordance with one or more example embodiments of the disclosure. The electronic device(s) 700 may include any suitable computing device including, but not limited to, a server system, a mobile device such as a smartphone, a tablet, an e-reader, a wearable device, or the like; a desktop computer; a laptop computer; a content streaming device; or the like. The electronic device(s) 700 may correspond to an illustrative device configuration for the device(s) of FIGS. 1-6.

The electronic device(s) 700 may be configured to communicate with one or more servers, user devices, or the like. The electronic device(s) 700 may be configured to render digital content.

The electronic device(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more display stack(s) 714, one or more optional microphone(s) 716, and data storage 720. The electronic device(s) 700 may further include one or more bus(es) 718 that functionally couple various components of the electronic device(s) 700. The electronic device(s) 700 may further include one or more antenna(e) 726 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the electronic device(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the electronic device(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the electronic device(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the electronic device(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the electronic device(s) 700 and the hardware resources of the electronic device(s) 700. More specifically, the O/S 722 may include a set of computer-executable instructions for managing the hardware resources of the electronic device(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 700 is a mobile device, the DBMS 724 may be any suitable lightweight DBMS optimized for performance on a mobile device.

Referring now to other illustrative components of the electronic device(s) 700, the input/output (I/O) interface(s) 706 may facilitate the receipt of input information by the electronic device(s) 700 from one or more I/O devices as well as the output of information from the electronic device(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 726 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The electronic device(s) 700 may further include one or more network interface(s) 708 via which the electronic device(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(e) 726 may include any suitable type of antenna depending, for example, on the communications protocols used to transmit or receive signals via the antenna (e) 726. Non-limiting examples of suitable antennae may include directional antennae, non-directional antennae, dipole antennae, folded dipole antennae, patch antennae, multiple-input multiple-output (MIMO) antennae, or the like. The antenna(e) 726 may be communicatively coupled to one or more transceivers 712 or radio components to which or from which signals may be transmitted or received.

As previously described, the antenna(e) 726 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 726 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 726 may be configured to transmit or receive radio frequency signals within any suitable frequency range forming part of the unlicensed portion of the radio spectrum.

The antenna(e) 726 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 726—transmitting or receiving radio frequency (RF) signals in the bandwidth and/or channels corresponding to the communications protocols utilized by the electronic device(s) 700 to communicate with other devices. The transceiver(s) 712 may include hardware, software, and/or firmware for modulating, transmitting, or receiving—potentially in cooperation with any of antenna(e) 726—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the electronic device(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The display stack(s) 714 may be a reflective display stack, and may include high contrast frontlight structures, such as those described in conjunction with FIGS. 1-6. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the electronic device(s) 700 may include alternate and/or additional hardware, software, or firmware components beyond those described or depicted without departing from the scope of the disclosure. More particularly, it should be appreciated that software, firmware, or hardware components depicted as forming part of the electronic device(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An electronic reader device comprising:
   a light emitting diode (LED);
   a light guide configured to direct light emitted from the LED, wherein the LED is disposed about an edge surface of the light guide, the light guide comprising:
   a first angled layer having a first refractive index value of about 1.57 and a first thickness, wherein the first angled layer is disposed transverse to a horizontal axis of the light guide at an angle of about 45 degrees;
   a second angled layer disposed adjacent to the first angled layer, the second angled layer having a second refractive index value of about 1.59 and a second thickness that is greater than the first thickness, wherein the second angled layer is disposed transverse to the horizontal axis at the angle;
   a third angled layer disposed adjacent to the second angled layer, the third angled layer having the first refractive index value and the first thickness, wherein the third angled layer is disposed transverse to the horizontal axis at the angle; and
   a fourth angled layer disposed adjacent to the third angled layer, the fourth angled layer having the second refractive index value and the second thickness, wherein the fourth angled layer is disposed transverse to the horizontal axis at the angle;
   wherein the first angled layer, the second angled layer, the third angled layer, and the fourth angled layer are parallel;
   a liquid crystal display (LCD) panel disposed about a lower surface of the light guide, the LCD panel configured to reflect at least a portion of light that propagates through the light guide; and
   an optically clear adhesive layer disposed between the light guide and the LCD panel.

2. The electronic reader device of claim 1, wherein a first lateral distance between the first angled layer and the LED is less than a second lateral distance between the second angled layer and the LED;
   wherein a third lateral distance between the third angled layer and the LED is greater than the second lateral distance and less than a fourth lateral distance between the fourth angled layer and the LED; and
   wherein a fifth lateral distance between the first angled layer and the second angled layer is greater than a sixth lateral distance between the third angled layer and the fourth angled layer.

3. The electronic reader device of claim 1, wherein the light guide further comprises:
   a fifth angled layer having a third refractive index value that is greater than the second refractive index value, wherein the fifth angled layer is located a first lateral distance from the LED; and
   a sixth angled layer having a fourth refractive index value that is greater than the third refractive index value, wherein the sixth angled layer is located a second lateral distance from the LED, wherein the second lateral distance is greater than the first lateral distance.

4. The electronic reader device of claim 1, wherein the light guide has a first height, and wherein the first angled layer, the second angled layer, the third angled layer, and the fourth angled layer have a second height measured along a vertical axis of the light guide, wherein the second height is less than the first height; and
wherein the first angled layer, the second angled layer, the third angled layer, and the fourth angled layer are vertically aligned along the horizontal axis, such that the respective angled layers are embedded within the light guide.

5. A display structure comprising:
a diode;
a reflective display; and
a light guide coupled to the reflective display, the light guide comprising:
a first layer having a first refractive index value;
a second layer having a second refractive index value;
a third layer having the first refractive index value; and
a fourth layer having the second refractive index value,
wherein the second refractive index value is greater than the first refractive index value;
wherein the first layer and the third layer have a first thickness, and wherein the second layer and the fourth layer have a second thickness that is greater than the first thickness.

6. The display structure of claim 5, wherein the first layer, the second layer, the third layer, and the fourth layer are disposed transverse to a horizontal axis of the light guide, wherein the second layer is disposed between the first layer and the third layer, and wherein the third layer is disposed between the second layer and the fourth layer.

7. The display structure of claim 5, wherein the first layer, the second layer, the third layer, and the fourth layer are disposed transverse to the horizontal axis of the light guide at an angle of between about 30 degrees and about 60 degrees.

8. The display structure of claim 5, wherein the first layer, the second layer, the third layer, and the fourth layer are parallel.

9. The display structure of claim 5, wherein the light guide further comprises a fifth layer having the first refractive index value and a sixth layer having the first refractive index value;
wherein the first layer is separated from the third layer by a first distance, and the fifth layer is separated from the sixth layer by a second distance that is less than the first distance.

10. The display structure of claim 5, wherein the light guide further comprises a fifth layer having the first refractive index value and a sixth layer having the first refractive index value;
wherein the first layer is separated from the third layer by a distance, and the fifth layer is separated from the sixth layer by the distance.

11. The display structure of claim 5, wherein the light guide further comprises a fifth layer having a third refractive index value that is greater than the second refractive index value, and a sixth layer having a fourth refractive index value that is greater than the third refractive index value.

12. The display structure of claim 11, wherein the first layer, the second layer, the third layer, the fourth layer, the fifth layer, and the sixth layer are vertically aligned and are embedded in the light guide.

13. The display structure of claim 11, wherein the first layer is disposed a first distance from the diode, the second layer is disposed a second distance from the diode that is greater than the first distance, the third layer is disposed a third distance from the diode that is greater than the second distance, the fourth layer is disposed a fourth distance from the diode that is greater than the third distance, the fifth layer is disposed a fifth distance from the diode that is greater than the fourth distance, and the sixth layer is disposed a sixth distance from the diode that is greater than the fifth distance.

14. The display structure of claim 5, wherein the reflective display is an LCD display and wherein the first refractive index value is about 1.57 and the second refractive index value is about 1.59.

15. A display structure comprising:
a light guide comprising:
a first set of tilted layers having a first refractive index value and a first thickness; and
a second set of tilted layers having a second refractive index value that is greater than the first refractive index value and a second thickness that is greater than the first thickness, wherein the first set of tilted layers and the second set of tilted layers are disposed in an alternating arrangement;
a light emitting diode (LED) disposed adjacent to a side of the light guide; and
a reflective display coupled to a lower surface of the light guide.

16. The display structure of claim 15, wherein the first set of tilted layers and the second set of tilted layers are disposed transverse to a horizontal axis of the light guide at an angle of between about 10 degrees and about 60 degrees.

17. The display structure of claim 15, wherein the first set of tilted layers and the second set of tilted layers are parallel.

18. The display structure of claim 15, wherein the light guide further comprises a third set of tilted layers having a third refractive index value that is greater than the second refractive index value, and a fourth set of tilted layers having a fourth refractive index value that is greater than the third refractive index value.

* * * * *